Oct. 5, 1965     P. F. WAIVERS     3,209,640
SCREW WITH HEAT EXCHANGE PASSAGE
Filed Nov. 13, 1962     2 Sheets-Sheet 1
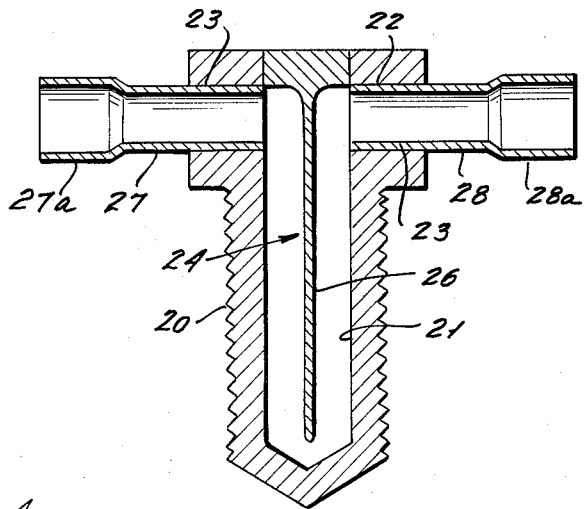
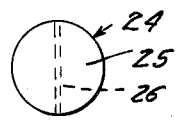
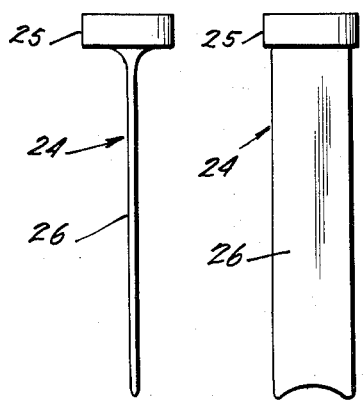
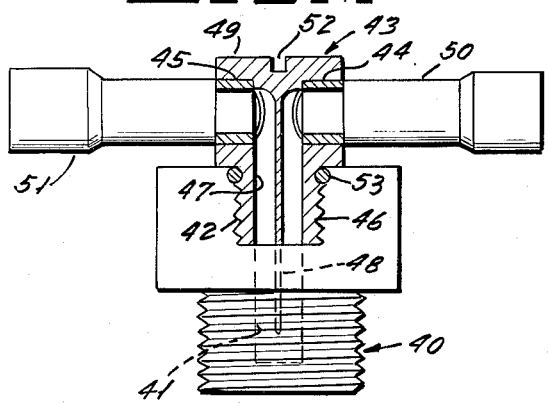
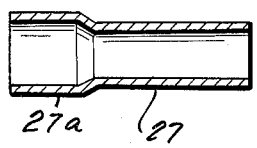
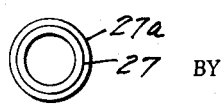
INVENTOR.
PAUL F. WAIVERS
BY
OSTROLENK, FABER, GERB & SOFFEN
ATTORNEYS

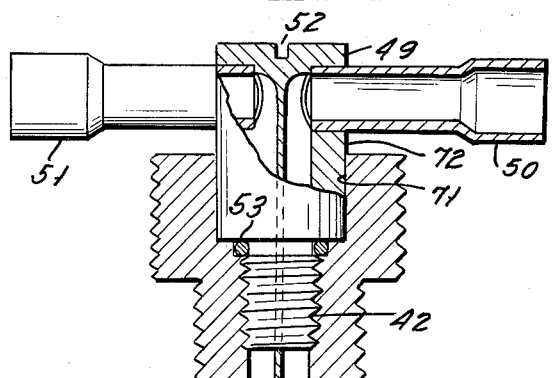
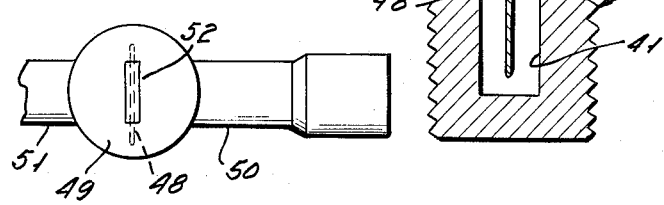
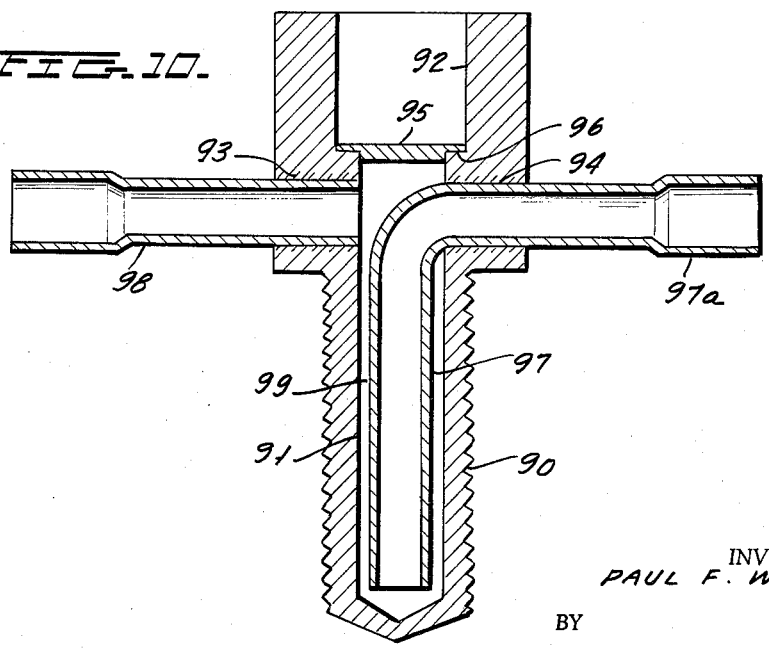

United States Patent Office 3,209,640
Patented Oct. 5, 1965

3,209,640
SCREW WITH HEAT EXCHANGE PASSAGE
Paul F. Waivers, Florence, N.J., assignor to United Aero Products Corporation, Burlington, N.J., a corporation of New Jersey
Filed Nov. 13, 1962, Ser. No. 236,984
3 Claims. (Cl. 85—1)

This invention relates to a novel screw construction, and more specifically relates to a novel screw construction which permits the screw to be fluid cooled or heated.

There are many applications in which a screw or bolt is required to bolt two components together where the two components also must be heated or cooled. By way of example, when high power rectifiers of the semiconductor type are bolted to a bus, proper cooling is essential to satisfactory performance and long life of the rectifier element. Other applications in which a joint should be heated or cooled will be apparent to those skilled in the art.

The principle of the present invention is to provide a fluid conducting chamber in a screw which permits the introduction and circulation of a heat exchange fluid through the body of the screw.

In a preferred embodiment of the invention, an opening is formed along the axis of the screw terminting at a point somewhat above the bottom of the screw. A fluid diverting means such as a baffle is then introduced into the opening, and fluid conduits are then introduced into the opening on either side of the baffle. The top of the baffle closes the opening in the screw, whereby the baffle will define an elongated fluid-flow path which is at least partially confined by the walls of the opening in the screw so that highly efficient heat exchange can take place between the fluid and the screw body.

Accordingly, a primary object of this invention is to provide a temperature controlled screw.

Another object of this invention is to provide a novel screw construction wherein the screw is provided with a heat exchange fluid conducting path.

These and other objects of this invention will become apparent from the following description when taken in connection with the drawings, in which:

FIGURE 1 shows a side cross-sectional view of a screw which has a baffle opening for conducting a heat exchange medium.

FIGURE 2 is a side plan view of the baffle used in the screw of FIGURE 1.

FIG. 3 is a side plan view of FIGURE 2.

FIGURE 4 is a bottom plan view of FIGURE 2.

FIGURE 5 is a side cross-sectional view of the conduit used in FIGURE 1.

FIGURE 6 is a side plan view of the conduit of FIGURE 5.

FIGURE 7 is a partial side cross-sectional view of a second embodiment of the invention in which an adapter structure is threadably received by a machine screw of the type having a hexagonal head.

FIGURE 8 shows a partial cross-sectional view through a further embodiment of the invention as applied to a socket head type screw.

FIGURE 9 is a top plan view of FIGURE 8.

FIGURE 10 shows a further embodiment of the invention wherein the fluid directing means for the screw is composed of a tube.

Referring first to FIGURES 1 through 6, I have illustrated therein a screw 20 in cross-section. The screw 20 can, for example, be of the hex head machine type.

In accordance with the invention, an opening 21 is drilled along the axis of screw 20 which has a diameter of 1/4", and can reach almost to the bottom of the screw, as illustrated.

A first and second opening 22 and 23 are then drilled through the hexagonal head of screw 20 which have diameters, for example, of 1/16" and communicate with opening 21.

A baffle plug 24, best shown in FIGURES 2, 3 and 4, is then inserted into opening 21, as shown in FIGURE 1, and is secured therein, as will be described more fully hereinafter. The baffle plug 24 has an enlarged head portion 25 which has a diameter substantially equal to the diameter of opening 21 at the top of the opening. Note that opening 21 may have an enlarged section at the top thereof to receive head 25 and hold it in an appropriate position.

A shank 26 extends from head 25 which has a width substantially equal to the diameter of opening 21 where the dimensions are such that the shank can be inserted into the opening, as illustrated in FIGURE 1. The thickness of shank 26 can, for example, be .010 inch. The length of shank 26 is such that it will not reach to the bottom of opening 21, but will, as illustrated in FIGURE 1, permit communication between the two sides of shank 26.

Two nipples or inlet and outlet conduit means 27 and 28 (FIGURES 5 and 6) which have an outer diameter sufficient to be received by openings 22 and 23 respectively are then inserted into openings 22 and 23 so as to communicate with the opposite sides of the baffle or shank 26 of baffle plug 24. It will be apparent that a path of a fluid heat exchange medium is established from conduit 28 down along the right-hand side of opening 21 as defined by shank 26 to the bottom of opening 21, and thence upwardly along the left-hand side of opening 21 to conduit 27. Moreover, conduit means 27 and 28 are provided with expanded ends 27a and 28a as shown.

In a typical embodiment of the invention, all of the components used could be of any appropriate material such as stainless steel. Other types of metals will obviously lend themselves to this type of construction.

When a stainless steel material is used, it is preferable to first assemble the elements, as illustrated with appropriate brazing fluxes being applied to the parts. Thereafter, the complete assembly can be placed in an oven with all of the parts being brazed together at one and the same time.

It will be apparent that the screw of FIGURE 1 can be used in applications where at heat sink or a heat source is required for any type unit which can be threaded to receive the screw. Another major field of application is where two members are to be bolted together and require a heat source or heat sink.

FIGURE 7 illustrates an embodiment of the invention wherein a detachable assembly can be used with a simply modified machine screw, whereby existing installations of screws can be simply modified to have heat sources or heat sinks secured thereto.

More specifically, in FIGURE 7, I have illustrated a typical hex-head machine screw 40 which could, for example, be of the type 1/4-28.

In accordance with the invention, the only modification required of screw 40 is that an opening 41 be drilled therein with the upper end of the opening being tapped with threads 42 which could, for example, receive a number 4-40 thread.

The novel adapting mechanism of the invention includes a manifold member 43 which has a body portion 49 which is formed to have two openings 44 and 45 drilled therein and an extending shank portion 46 which is threaded to be received by threads 42.

A central opening 47 formed in member 43 is arranged to communicate with opening 41 in screw 40, and a baffle member 48 is secured to the bottom surface of head portion 49, as illustrated, to divided openings 47 and 41 into two chambers, as in FIGURE 1.

The two openings 44 and 45 then receive the input and output conduit means 50 and 51 respectively, and the head 49 is formed to have a screwdriver slot 52. The adapting device is then secured together, as by brazing, for example, whereby, after forming opening 41 and thread 42 in the screw 40, the complete adapter assembly can be screwed into the machine screw 40, as illustrated in FIGURE 7. It will be noted that a gasket 53, which could be an O-ring, is contained between the adapter structure and the machine screw to permit a good seal in the fluid path.

If desired, the arrangement shown in FIGURE 7 could be modified wherein the manifold body 46 is separate from head 49 and baffle plate 48 wherein these two components are further parts of the subassembly.

FIGURES 8 and 9 show a further variation of the arrangement of FIGURE 7 for a screw 70 which can, for example, be a socket head screw.

In FIGURE 8 those components similar to components of FIGURE 7 have been given similar identifying numerals. Thus, the screw assembly which could, for example, have a 1/4-28 thread has the opening 41 drilled therein which is threaded at threads 42 which, in the case of FIGURE 8, could be a 4–40 thread. Thereafter, the bottom of the hex wrench hole is counterbored to accept an O-ring and to permit seating of manifold 72. Clearly, the attachable portion of the structure of FIGURE 8 is threadably received by threads 42 with the O-ring 53 completing the seal in the usual manner.

Again, as was the case in FIGURE 8, the novel attachment defines a fluid-flow path from conduit 50 down through the right-hand side of baffle 48 up along the left-hand side of baffle 48 and to conduit 51.

It will be observed that the walls of opening 41 form a portion of this conduit so that there is direct contact between the heat exchange medium and the body of screw 70.

A further embodiment of the invention is shown in FIGURE 10 wherein the fluid directing means is comprised of a concentric channel. More specifically, FIGURE 10 illustrates a socket head screw 90 which has an opening 91 drilled therein, as has been described in the above embodiments, wherein the opening 91 communicates with a larger diameter opening portion 92 at the top of the screw. Two openings 93 and 94 are then drilled in the head of screw 90 (these can be drilled in a common drilling operation), and a plug member 95 fits over the shoulder 96 defined at the junction of openings 91 and 92.

A tube 97 is then inserted in opening 94, and is caused to be directed downwardly into opening 91. In a similar manner, a second tube 98 is placed in opening 93. Each of tubes 97 and 98 can, for example, have an outer diameter of 0.093 inch when screw 90 is of the type 3/8-24. Such tubing is readily available as the tubing presently used for hypodermic needles and is, for example, of stainless steel.

While FIGURE 10 illustrates tube 97 as being one tube which is bent during insertion into the opening 91, it should be observed that the tube 97 can be made of two portions which meet one another along diagonal cuts to avoid difficulties of bending tube 97.

After the components shown in FIGURE 10 are subassembled, as illustrated, appropriate brazing fluxes are provided, and the complete assembly is brazed together.

It will be observed that the outer diameter of tube 97 is made smaller than the inner diameter of opening 91 so as to define an annular chamber 99. Therefore, when a fluid heat exchange medium is applied to conduit 97 at its enlarged portion 97a, the fluid will flow down the center of tube 97 to the bottom of tube 97 and will then return upwardly through the annular chamber 99 so that the fluid is in intimate contact with the walls of opening 91. The fluid will then reach the top of opening 91 to pass through conduit 98.

Although this invention has been described with respect to its preferred embodiments, it should be understood that many variations and modifications will now be obvious to those skilled in the art, and it is preferred, therefore, that the scope of this invention be limited not by the specific disclosure herein but only by the appended claims.

What is claimed is:

1. A fluid cooled screw comprising an externally threaded screw member having an axially directed opening extending from a first axial position along said screw toward a second axial position along said screw and having a closed end for said opening, an input conduit means and output conduit means communicating with said axially directed opening, and a flat fluid directing means in said opening for directing fluid from said input conduit means through at least a portion of said opening and to said output conduit means; said fluid directing means comprising a baffle extending completely across said opening and terminating adjacent said closed end; said first conduit means communicating with one side of said baffle; said second conduit means communicating with the other side of said baffle; said screw having a screw head provided with tool engaging means; said opening extending into said screw head; and an insert means including walls; said first and second conduit means extending through the walls of said insert said insert means being received by said screw head; said insert means having a head portion for closing the top of said opening; said fluid directing means being secured to and extending from the bottom of said insert means.

2. A fluid cooled screw comprising an externally threaded screw member having an axially directed opening extending from a first axial position along said screw toward a second axial position along said screw and having a closed end for said opening, an input conduit means and output conduit means communicating with said axially directed opening, and a flat fluid directing means extending completely across said opening and terminating adjacent said closed end for directing fluid from said input conduit means through at least a portion of said opening and to said output conduit means; said screw having a screw head provided with tool engaging means; said opening extending into said screw head; and an insert means including wall; said insert means being received by said screw head; said insert means having a head portion for closing the top of said opening; said fluid directing means being secured to and extending from the bottom of said insert means; said insert having a central opening extending from its said head portion and communicating with said opening in the screen; said first and second conduits extending through the walls of said insert and into said central opening in said insert.

3. A fluid cooled screw comprising an externally threaded screw member having an axially directed opening extending from a first axial position along said screw toward a second axial position along said screw and having a closed end for said opening, an input conduit means and output conduit means communicating with said axially directed opening, and a flat directing means in said opening for directing fluid from said input conduit means through at least a portion of said opening and to said output conduit means; said fluid directing means comprising a substantially flat baffle extending completely across said opening and terminating adjacent said closed end; said first conduit means communicating with one side of said baffle; said second conduit means communicating with the other side of said baffle; said screw having a screw head provided with tool engaging means; said opening extending into said screw head; and an insert means including walls; said insert means being received by said screw head; said insert means having a head portion for closing the top of said opening; said fluid directing means being secured to and extending from the bottom of said insert means; said insert having a central opening extending from its said head portion and communicating with said opening in the screen; said first and second conduit means extending through the walls of said insert and into said central opening in said insert.

References Cited by the Examiner

UNITED STATES PATENTS

| | | | |
|---|---|---|---|
| 1,663,336 | 3/28 | Dodds | 85—1.5 |
| 1,666,660 | 4/28 | Makin | 165—142 |
| 1,835,323 | 12/31 | Olson et al. | 165—74 |
| 2,881,012 | 4/59 | Rings | 285—130 |

EDWARD C. ALLEN, *Primary Examiner.*